US012789762B2

(12) United States Patent
Rosso et al.

(10) Patent No.: US 12,789,762 B2
(45) Date of Patent: Nov. 10, 2026

(54) NOISE-MITIGATING CLIP

(71) Applicant: Rivian IP Holdings, LLC, Irvine, CA (US)

(72) Inventors: Nathaniel Risler Rosso, Torrance, CA (US); Aalap Ashtamkar, Santa Ana, CA (US); Andres Martinez Cancino, Tustin, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 19/057,323

(22) Filed: Feb. 19, 2025

(65) Prior Publication Data

US 2026/0241901 A1 Aug. 20, 2026

(51) Int. Cl.
*B60T 7/06* (2006.01)
*F16B 2/22* (2006.01)
*F16C 11/04* (2006.01)

(52) U.S. Cl.
CPC .................. *B60T 7/06* (2013.01); *F16B 2/22* (2013.01); *F16C 11/045* (2013.01)

(58) Field of Classification Search
CPC ............. B60T 7/06; F16B 2/22; F16C 11/045
See application file for complete search history.

(56) References Cited

U.S. PATENT DOCUMENTS 5,599,056 A * 2/1997 Schmitt .................... F16C 33/20 16/259
9,278,752 B2 * 3/2016 Osvog ...................... F16C 27/02
10,133,294 B2 * 11/2018 Kawahara ................ F16C 35/02
2002/0125049 A1 * 9/2002 Kajiyama ............ B60N 2/0705 177/136
2007/0193393 A1 * 8/2007 Collins ..................... G05G 1/46 74/512
2009/0229402 A1 * 9/2009 Khan ......................... B60T 7/06 74/512

* cited by examiner

*Primary Examiner* — Thomas C Diaz
(74) *Attorney, Agent, or Firm* — Foley & Lardner LLP

(57) ABSTRACT

A brake assembly may include a brake pedal shaft. The brake assembly may include a brake booster assembly including a pushrod slidably received in a body, the pushrod including a clevis having a first clevis arm and a second clevis arm, the brake pedal shaft to move the pushrod into the body. The brake assembly may include a clip including a first clip arm and a second clip arm, the first clip arm positioned between the first clevis arm and the brake pedal shaft, the second clip arm positioned between the second clevis arm and the brake pedal shaft, the clip to mitigate a noise caused by an interaction between the clevis and the brake pedal shaft during operation of the brake assembly.

10 Claims, 14 Drawing Sheets

NOISE-MITIGATING CLIP

INTRODUCTION

Vehicles such as automobiles include an actuatable brake pedal assembly.

SUMMARY

The present disclosure is directed to systems and methods of a brake assembly, such as a brake assembly for an electric vehicle. The brake assembly can include a shaft of a brake pedal assembly coupled with a clevis of a brake booster assembly. For example, a user (e.g., a driver) or a brake assist system can actuate the brake assembly by depressing a brake pedal of the brake pedal assembly to apply a force to the clevis, where the force applied to the clevis can cause a pushrod of the brake booster assembly to slide into a body of the brake booster assembly and ultimately slow or stop the vehicle (e.g., by causing brakes of the vehicle to slow a motion of the vehicle). The force applied to the clevis by the brake pedal shaft can cause a mechanical interaction between the brake pedal shaft and the clevis that can create an audible noise during actuation of the brake assembly. Such audible noise can be particularly pronounced in instances where the brake assembly is actuated via a brake assist system (e.g., a motor to actuate the brake assembly automatically) because of an increased acceleration of the brake pedal shaft relative to the clevis as compared to instances where the brake assembly is actuated by a driver (e.g., manually). The brake assembly can include a clip (e.g., a noise-mitigating clip) positioned at least partially between the brake pedal shaft and the clevis to reduce, mitigate, or substantially eliminate a noise resulting from an interaction between the brake pedal shaft and the clevis. The clip can be positioned against the clevis and the brake pedal shaft and can apply a force (e.g., a preload) to the brake pedal shaft and the clevis. The clip can be or include a compliant material having some spring coefficient such that the clip can be at least partially compressed between the brake pedal shaft and the clevis to reduce, mitigate, or substantially eliminate a noise caused by interaction of the brake pedal shaft and the clevis. For example, the clip can apply a force to the shaft and the clevis such that the shaft and clevis are under constant preload. The force applied by the clip must first be overcome before the shaft can interact with the clevis as the brake assembly is actuated. Because the force must first be overcome, the acceleration of the shaft relative to the clevis can be reduced and a noise resulting from high-acceleration interaction between the shaft and the clevis can be reduced, mitigated, or substantially eliminated.

In some aspects, the techniques described herein relate to a brake assembly, including: a brake pedal shaft having a pedal end and a pivot end; a brake booster assembly including a pushrod slidably received in a body, the pushrod including a clevis having a first clevis arm and a second clevis arm, the brake pedal shaft to move the pushrod into the body; and a clip including a first clip arm and a second clip arm, the first clip arm positioned between the first clevis arm and the brake pedal shaft, the second clip arm positioned between the second clevis arm and the brake pedal shaft, the clip to mitigate a noise caused by an interaction between the clevis and the brake pedal shaft during operation of the brake assembly.

In some aspects, the techniques described herein relate to a noise-mitigating clip for a brake pedal assembly, including: a first clip arm and a second clip arm, the first clip arm to be positioned between a first clevis arm of a brake booster clevis and a brake pedal shaft, the second clip arm positioned between a second clevis arm of the brake booster clevis and the brake pedal shaft; the clip to mitigate a noise caused by an interaction between the clevis and the brake pedal shaft during operation of the brake assembly.

In some aspects, the techniques described herein relate to an electric vehicle, including: a battery pack; and a brake pedal assembly, including: a brake pedal shaft having a pedal end and a pivot end; a brake booster assembly including a pushrod slidably received in a body, the pushrod including a clevis having a first clevis arm and a second clevis arm, the brake pedal shaft to move the pushrod into the body; and a clip including a first clip arm and a second clip arm, the first clip arm positioned between the first clevis arm and the brake pedal shaft, the second clip arm positioned between the second clevis arm and the brake pedal shaft, the clip to mitigate a noise caused by an interaction between the clevis and the brake pedal shaft during operation of the brake assembly.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of brake pedal assemblies. The various concepts introduced above and discussed in greater detail below may be implemented in any of numerous ways.

The present disclosure is directed to systems and methods of a brake assembly, such as a brake assembly for an electric vehicle. The brake assembly can include a shaft of a brake pedal assembly coupled with a clevis of a brake booster assembly. For example, a user (e.g., a driver) or a brake assist system can actuate the brake assembly by depressing a brake pedal of the brake pedal assembly to apply a force to the clevis, where the force applied to the clevis can cause a pushrod of the brake booster assembly to slide into a body of the brake booster assembly and ultimately slow or stop the vehicle (e.g., by causing brakes of the vehicle to slow a motion of the vehicle). The force applied to the clevis by the brake pedal shaft can cause a mechanical interaction between the brake pedal shaft and the clevis that can create an audible noise during actuation of the brake assembly. Such audible noise can be particularly pronounced in instances where the brake assembly is actuated via a brake assist system (e.g., a motor to actuate the brake assembly automatically) because of an increased acceleration of the brake pedal shaft relative to the clevis as compared to instances where the brake assembly is actuated by a driver (e.g., manually). The brake assembly can include a clip (e.g., a noise-mitigating clip) positioned at least partially between the brake pedal shaft and the clevis to reduce, mitigate, or substantially eliminate a noise resulting from an interaction between the brake pedal shaft and the clevis. The clip can be positioned against the clevis and the brake pedal shaft and can apply a force (e.g., a preload) to the brake pedal shaft and the clevis. The clip can be or include a compliant material having some spring coefficient such that the clip can be at least partially compressed between the brake pedal shaft and the clevis to reduce, mitigate, or substantially eliminate a noise caused by interaction of the brake pedal shaft and the clevis. For example, the clip can apply a force to the shaft and the clevis such that the shaft and clevis are under constant preload. The force applied by the clip must first be overcome before the shaft can interact with the clevis as the brake assembly is actuated. Because the force must first be overcome, the acceleration of the shaft relative to the clevis can be reduced and a noise resulting from high-acceleration interaction between the shaft and the clevis can be reduced, mitigated, or substantially eliminated.

Figure 1:
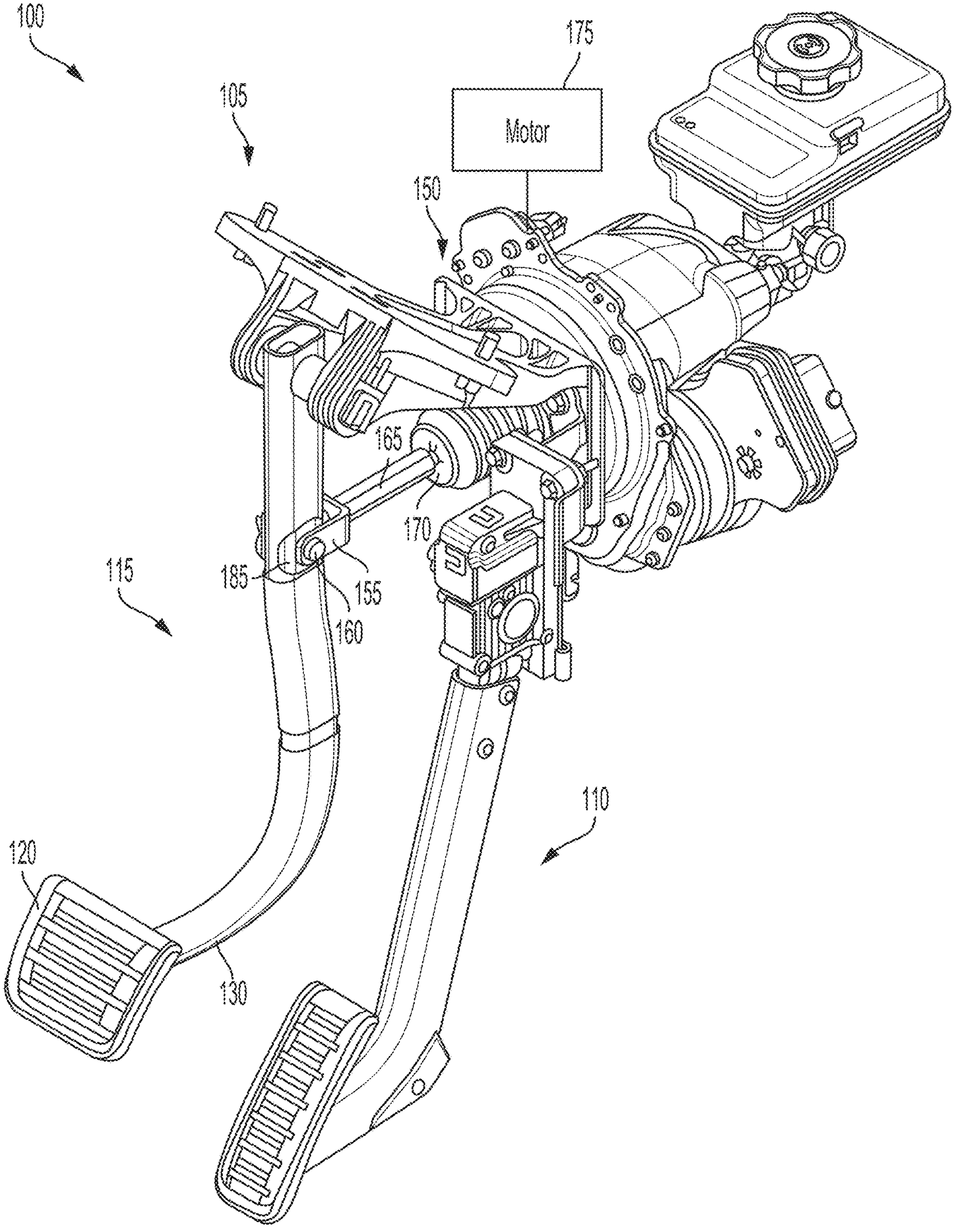
FIG. 1 depicts an example pedal assembly for a vehicle, in accordance with some aspects.
Figure 2:
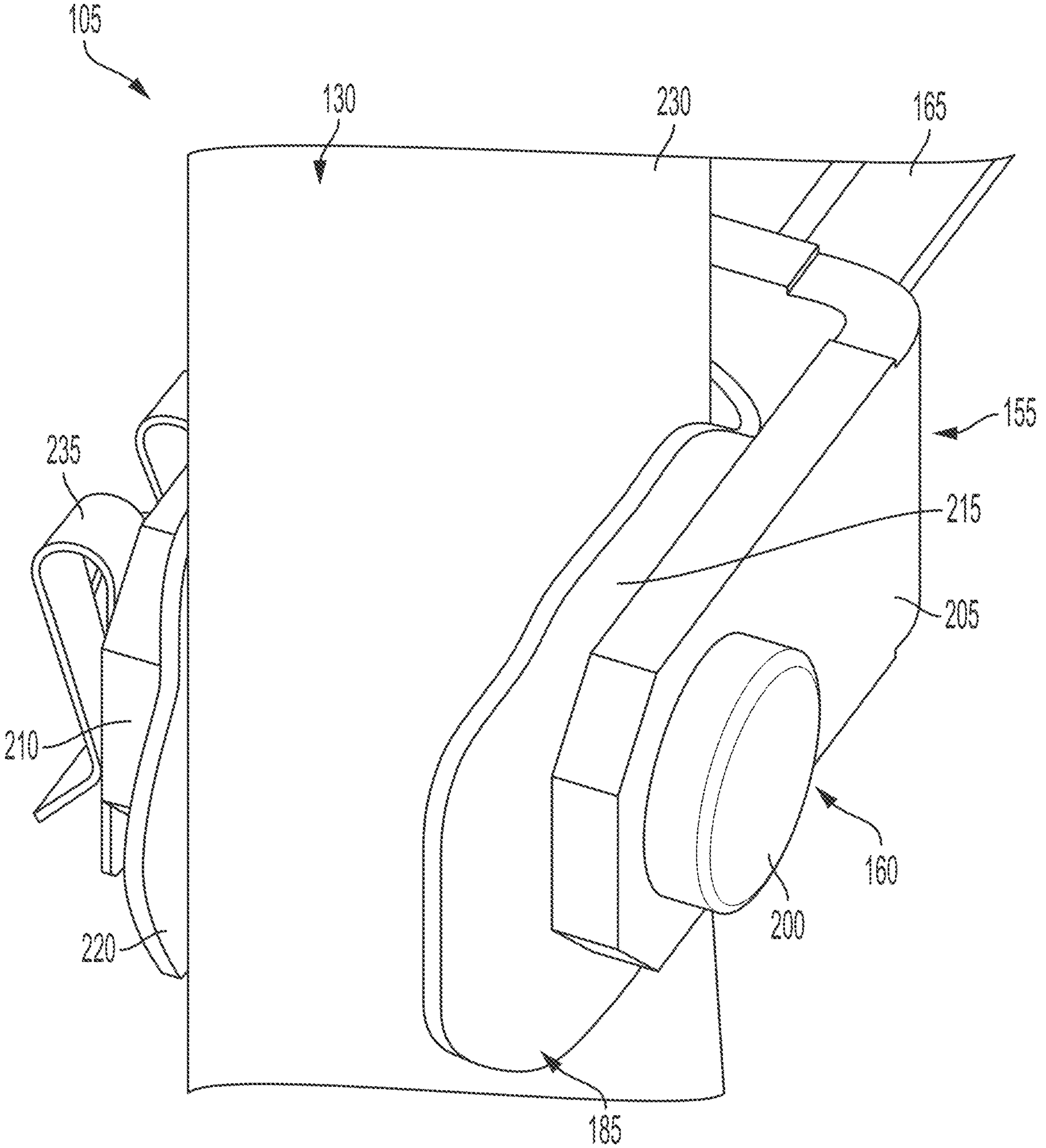
FIG. 2 depicts an example noise-mitigating clip of a brake assembly, in accordance with some aspects.
Figure 3:
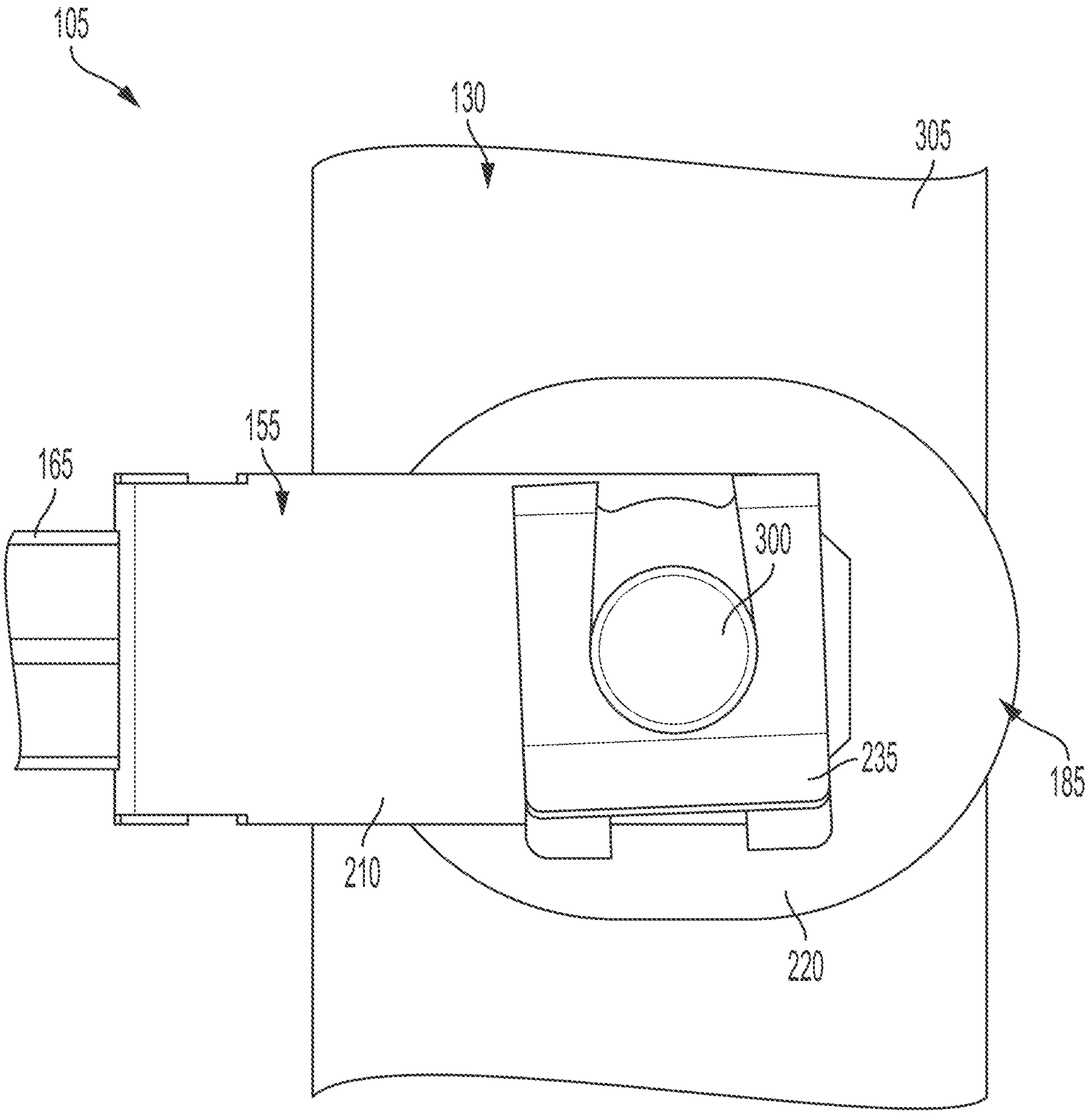
FIG. 3 depicts an example noise-mitigating clip of a brake assembly, in accordance with some aspects.
Figure 8:
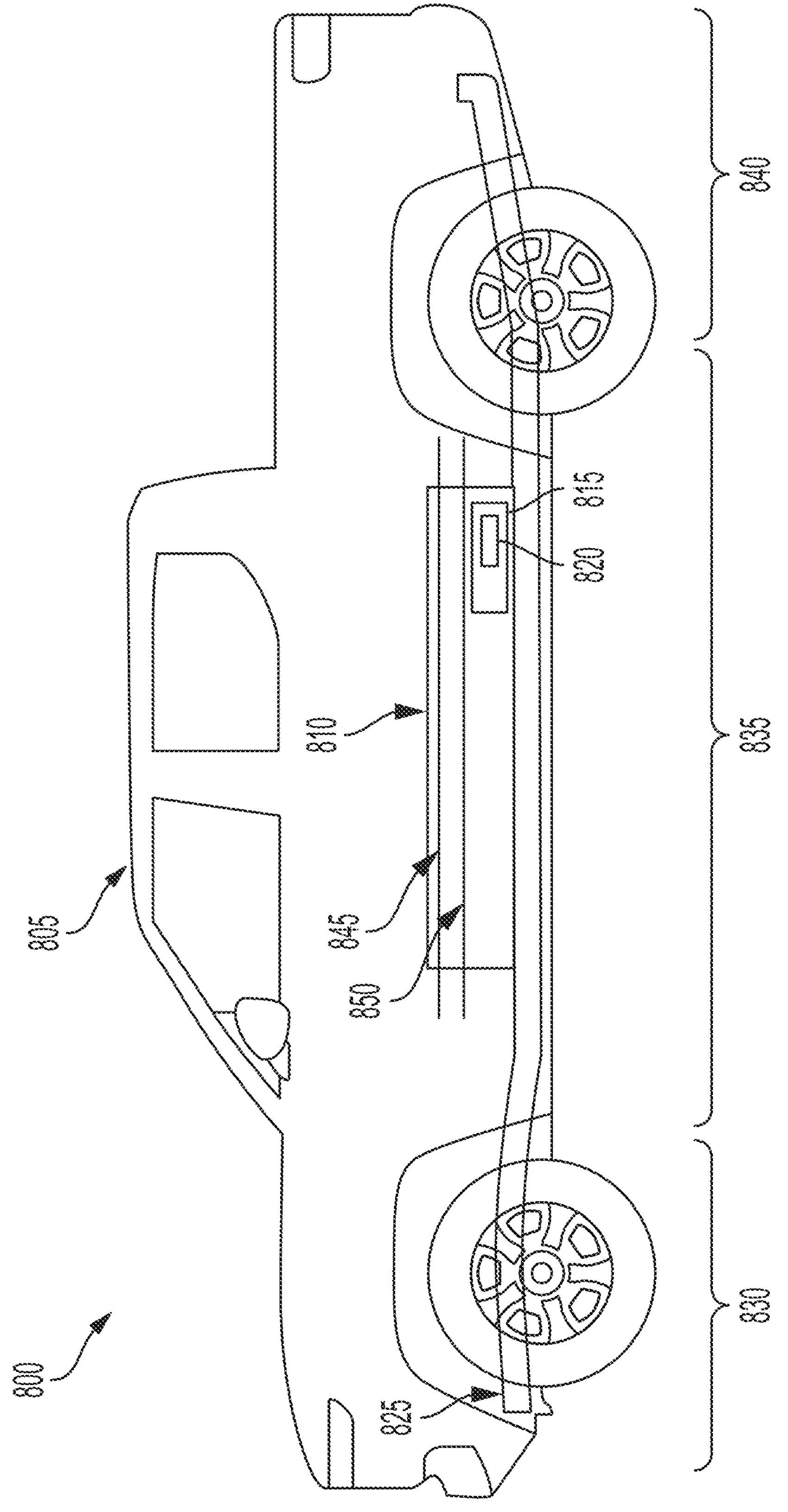
FIG. 8 depicts an electric vehicle, in accordance with some aspects.

FIG. 1, among others, depicts a pedal assembly 100 of a vehicle (e.g., the electric vehicle 805 as depicted in FIG. 8, among others). The pedal assembly 100 includes a brake assembly 105 and an accelerator assembly 110. The brake assembly 105 can be actuated by a user when the user depresses a pedal 120 (e.g., a brake pedal 120) of the brake assembly 105, or by a motor 175 that is electrically coupled with the brake assembly 105 to actuate the brake assembly 105 automatically. In both instances (e.g., whether the brake assembly 105 is manually actuated by a user or automatically actuated by the motor 175), a shaft 130 (e.g., a brake pedal shaft 130) of the brake assembly 105 can move. For example, the brake assembly 105 can include the shaft 130 pivotally coupled with a bracket or other structure of the brake assembly 105. The shaft 130 can be pivotally coupled with a bracket at a first end, and can include the pedal 120 at a second, opposing end, for example.

The shaft 130 of the brake assembly 105 can be coupled with a brake booster assembly 150. For example, the brake booster assembly 150 can receive a force input (e.g., a force via movement of the shaft 130) and can cause the brakes of the vehicle to operate to slow or stop the vehicle. For example, the brake booster assembly 150 can receive a force input, magnify that force input (e.g., via a diaphragm separating a vacuum chamber from an atmospheric chamber or other device), and transmit that force to a hydraulic device (e.g., a master cylinder), where the hydraulic device can actuate the brake of the vehicle. The brake can be a brake caliper and brake disc assembly, a brake drum assembly, or some other brake assembly. Accordingly, actuation of the brake booster assembly 150 can cause actuation of the vehicle brakes.

The brake assembly 105 can include the brake booster assembly 150 including a pushrod 165 that is slidably received in a body 170. The body 170 can include a diaphragm separating a vacuum chamber from an atmospheric chamber, for example. The pushrod 165 can be slidably received in the body 170 to actuate the brake booster assembly 150 (e.g., to actuate the diaphragm) and ultimately slow or stop the vehicle. The pushrod 165 can be a substantially (e.g., ±15%) linear member, or can have some other shape. A first end of the pushrod 165 is positioned within the body 170. A second end of the pushrod 165 can be a clevis 155 or a clevis end 155. The clevis 155 of the brake booster assembly 150 can be coupled with the shaft 130 via a pin 160 or some other fastener. For example, the shaft 130 and the clevis 155 can be mechanically coupled such that movement of the shaft 130 (e.g., pivotal movement of the shaft 130 about its pivot end via depression of the pedal 120) can cause the shaft 130 to apply a force to the pushrod 165 via the clevis 155 to move the pushrod 165 into the body 170. For example, when a user applies a force to the pedal 120, the shaft 130 can apply a corresponding force against the clevis 155, which can further cause the pushrod 165 to slide into the body 170 of the brake booster assembly 150 to cause the vehicle to slow or stop. In the case of automatic actuation of the brake assembly 105 via the motor 175, the motor 175 can cause the pushrod 165 to move into the body 170 of the brake booster assembly 150. Movement of the pushrod 165 can cause the clevis 155 to apply a force to the shaft 130, which can further cause the shaft 130 to pivot about its pivot end. In either case, whether actuation of the brake assembly 105 is manual or automatic, the shaft 130 and the clevis 155 can mechanically interact.

As depicted in FIGS. 1-7, among others, the brake assembly 105 can include a clip 185. The clip 185 can be a noise-mitigating clip 185. The clip 185 can be positioned at least partially between the shaft 130 and the clevis 155 to reduce, mitigate, or substantially eliminate (e.g., eliminate 80% or more of) a noise that can be caused via interaction of the shaft 130 and the clevis 155. The clip 185 can include a substantially U-shaped profile having a first clip arm 215 coupled with a second clip arm 220. The first clip arm 215 and the second clip arm 220 can extend in a generally similar direction. The first clip arm 215 can be a substantially mirror image of the second clip arm 220. For example, as discussed below with reference to FIGS. 4 and 7, among others, each of the first clip arm 215 and the second clip arm 220 can include at least one curved portion, where the curved portion of the first clip arm 215 can be a mirror image of a curved portion of the second clip arm 220.

The brake assembly 105 can include the clip 185 having the first clip arm 215 positioned between a first surface 230 of the shaft 130 and the first clevis arm 205. The brake assembly 105 can include the clip 185 having the second clip arm 220 positioned at least partially between a second surface 305 of the shaft 130 and the second clevis arm 210. For example, the first clip arm 215 can be positioned between the first surface 230 of the shaft 130 and the first clevis arm 205 with at least a portion of the first clip arm 215 contacting the first surface 230 and at least a portion of the first clip arm 215 contacting the first clevis arm 205. The first second clip arm 220 can be positioned between the second surface 305 of the shaft 130 and the second clevis arm 210 with at least a portion of the second clip arm 220 contacting the second surface 305 and at least a portion of the second clip arm 220 contacting the second clevis arm 210. The first clip arm 215 can directly contact the first surface 230 and the first clevis arm 205, or the first clip arm 215 can indirectly contact the first surface 230 and the first clevis arm 205 (e.g., with some layer, membrane, or other component disposed therebetween). The second clip arm 220 can directly contact the second surface 305 and the second clevis arm 210, or the second clip arm 220 can indirectly contact the second surface 305 and the second clevis arm 210 (e.g., with some layer, membrane, or other component disposed therebetween).

The first clip arm 215 can contact the first surface 230 to apply a force to the first surface 230. The first clip arm 215 can contact the first clevis arm 205 to apply a force to the first clevis arm 205. For example, the first clip arm 215 can contact the first surface 230 and the first clevis arm 205 to simultaneously apply a force (e.g., a preload force) to the first clevis arm 205 and the first surface 230. The first clip arm 215 can be or include a compliant material (e.g., a bendable material having some spring coefficient) such that the first clip arm 215 can act as a spring that—when compressed between the first clevis arm 205 and the first surface 230—can apply a force to both the first clevis arm 205 and the first surface 230. For example, the clip 185 can be or include a plastic material, a metal material (e.g., a stamped metal component), a composite material, some other material, or some combination thereof. The clip 185 can include a first, uncompressed shape and a second compressed shape. For example, the clip 185 can include the second compressed shape when positioned between the first surface 230 and the first clevis arm 205, and between the second surface 305 and the second clevis arm 220. The clip 185 can include a compliant material having a spring coefficient such that when in the second compressed shape, the clip 185 attempts to spring back to its first uncompressed shape, and in so doing imparts a force on the shaft 130, the first clevis arm 205, and the second clevis arm 210.

The second clip arm 220 can contact the second surface 305 to apply a force to the second surface 305. The second clip arm 220 can contact the second clevis arm 310 to apply a force to the second clevis arm 210. For example, the second clip arm 220 can contact the second surface 305 and the second clevis arm 210 to simultaneously apply a force (e.g., a preload force) to the second clevis arm 210 and the second surface 305. The second clip arm 220 can be or include a compliant material (e.g., a bendable material having some spring coefficient) such that the second clip arm 220 can act as a spring that—when compressed between the second clevis arm 210 and the second surface 305—can apply a force to both the second clevis arm 310 and the second surface 305.

Figure 4:
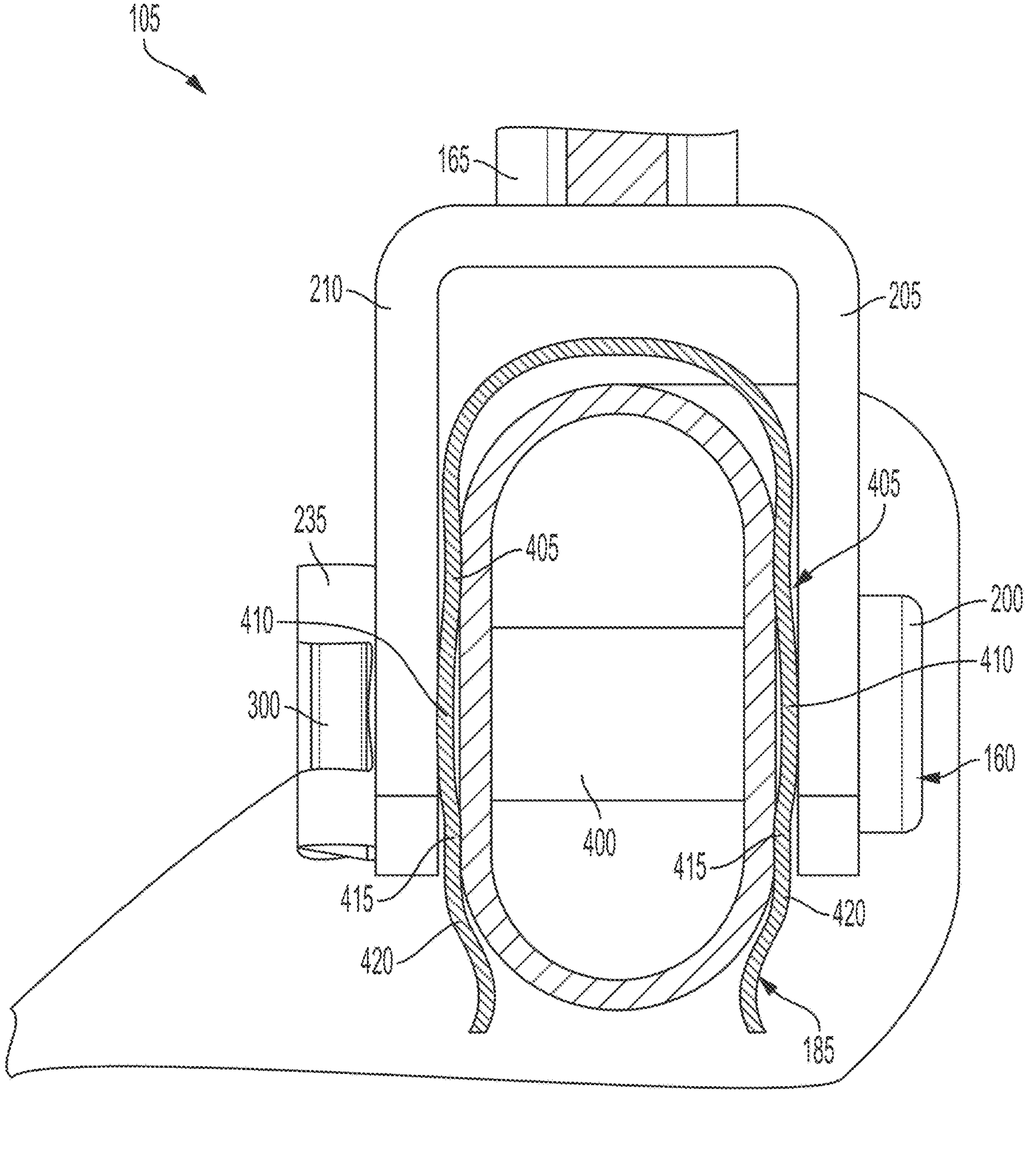
FIG. 4 depicts an example brake assembly, in accordance with some aspects.
Figure 7:
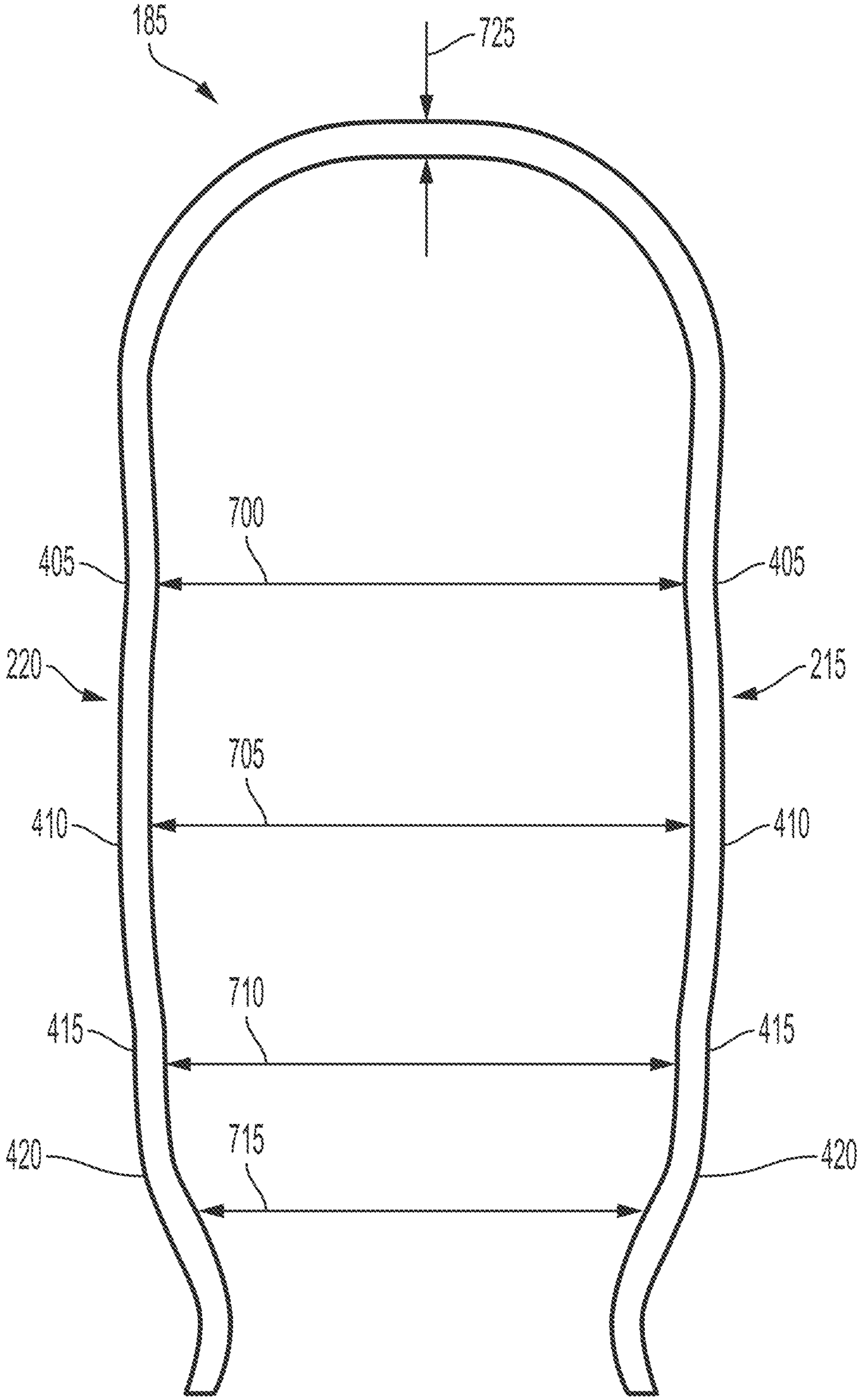
FIG. 7 depicts an example noise-mitigating clip of a brake assembly, in accordance with some aspects.

As depicted in FIGS. 4 and 7, among others, the clip 185 can include one or more of the first clip arm 215 and the second clip arm 220 having at least one curved portion. For example, the clip 185 can include both the first clip arm 215 and the second clip arm 220 having a first curved portion 405, a second curved portion 410, a third curved portion 415, and a fourth curved portion 420. The first clip arm 215 and the second clip arm 220 can include the first curved portion 405 continuous with (e.g., connected to, leading to) the second curved portion 410, the second curved portion 410 continuous with the third curved portion 415, and the third curved portion 415 continuous with the fourth curved portion 420. In other examples, the first curved portion 405, the second curved portion 410, the third curved portion 415, and the fourth curved portion 420 can be discontinuous in some fashion (e.g., where one curved portion is separated from an adjacent curved portion by some intervening member or portion). In other examples, the first clip arm 215 or the second clip arm 220 can include additional curved portions.

The clip 185 can include the first curved portion 405, the second curved portion 410, the third curved portion 415, and the fourth curved portion 420 having alternating concavity or convexity. For example, and as depicted in FIGS. 4 and 7, among others, the first curved portion 405 of the first clip arm 215 can be concave relative to an outer surface of the first clip arm 215 such that the first curved portion 405 curves inward toward the second clip arm 220. The first curved portion 405 of the second clip arm 220 can be concave relative to an outer surface of the second clip arm 220 such that the first curved portion 405 curves inward toward the first clip arm 215. The second curved portion 410 of the first clip arm 215 can be convex relative to an outer surface of the first clip arm 215 such that the first curved portion 405 curves outward away from the second clip arm 220. The second curved portion 410 of the second clip arm 220 can be convex relative to an outer surface of the second clip arm 220 such that the second curved portion 410 curves outward away from the first clip arm 215. The third curved portion 415 of the first clip arm 215 can be concave relative to an outer surface of the first clip arm 215 such that the third curved portion 415 curves inward toward the second clip arm 220. The third curved portion 415 of the second clip arm 220 can be concave relative to an outer surface of the second clip arm 220 such that the third curved portion 415 curves inward toward the first clip arm 215. The fourth curved portion 420 of the first clip arm 215 can be convex relative to an outer surface of the first clip arm 215 such that the fourth curved portion 420 curves outward away from the second clip arm 220. The fourth curved portion 420 of the second clip arm 220 can be convex relative to an outer surface of the second clip arm 220 such that the fourth curved portion 420 curves outward away from the first clip arm 215. The fourth curved portion 420 of the first clip arm 215 and the second clip arm 220 can include a curvature that mimics or substantially matches a curvature of a front of the shaft 130 such that the fourth curved portion 420 wraps around the front of the shaft 130.

The first curved portion 405 of the first clip arm 215 can contact the first surface 230 of the shaft 130. The first curved portion 405 of the second clip arm 220 can contact the second surface 305 of the shaft 130. The second curved portion 410 of the first clip arm 215 can contact the first clevis arm 205. The second curved portion 410 of the second clip arm 220 can contact the second clevis arm 210. The third curved portion 415 of the first clip arm 215 can contact the first surface 230 of the shaft 130. The third curved portion 415 of the second clip arm 220 can contact the second surface 305 of the shaft 130. In some examples, the fourth curved portion 420 of the first clip arm 215 can contact the first clevis arm 205. In other examples, the fourth curved portion 420 of the first clip arm 215 can wrap around a front of the shaft 130. In some examples, the fourth curved portion 420 of the second clip arm 220 can contact the second clevis arm 210. In other examples, the fourth curved portion 420 of the second clip arm 220 can wrap around a front of the shaft 130.

As depicted in FIG. 7, among others, the clip 185 can include a first distance 700 between the first curved portion 405 of the first clip arm 215 and the first curved portion 405 of the second clip arm 220. The clip 185 can include a second distance 705 between the second curved portion 410 of the first clip arm 215 and the second curved portion 410 of the second clip arm 220. As noted above, the first curved portion 405 of each of the first clip arm 215 and the second clip arm 220 can be concave relative to a respective outer surface of the first clip arm 215 and the second clip arm 220, while the second curved portion 410 of the first clip arm 215 and the second clip arm 220 can be convex relative to a respective outer surface of the first clip arm 215 and the second clip arm 220. Accordingly, the first distance 700 can be less than the second distance 705. The clip 185 can include a third distance 710 between the third curved portion 415 of the first clip arm 215 and the third curved portion 415 of the second clip arm 220. As noted above, the third curved portion 415 of each of the first clip arm 215 and the second clip arm 220 can be concave relative to a respective outer surface of the first clip arm 215 and the second clip arm 220, while the second curved portion 410 of the first clip arm 215 and the second clip arm 220 can be convex relative to a respective outer surface of the first clip arm 215 and the second clip arm 220. Accordingly, the third distance 710 can be less than the second distance 705. The third distance 710 can be substantially the same as (e.g., ±15%) the first distance 700, greater than the first distance 700 (but still less than the second distance 705), or less than the first distance 700. The clip 185 can include a fourth distance 715 between the fourth curved portion 420 of the first clip arm 215 and the fourth curved portion 420 of the second clip arm 220.

As noted above, the fourth curved portion 420 of both the first clip arm 215 and the second clip arm 220 can be convex relative to a respective outer surface of the first clip arm 215 and the second clip arm 220. In addition, the fourth curved portion 420 of both the first clip arm 215 and the second clip arm 220 can be shaped, dimensioned, or otherwise configured to wrap at least partially around the shaft 130 (e.g., wrap at least partially around a portion of a front of the shaft 130). For example, the fourth curved portion 420 of the first clip arm 215 and the fourth curved portion 420 of the second clip arm 220 can bend inwards at least partially around the shaft 130 and ultimately transition into a flared end, where the fourth distance 715 is less than a width of the shaft 130. Because the fourth curved portion 420 of the first clip arm 215 and the fourth curved portion 420 of the second clip arm 220 can be separated by the fourth distance 715 that is less than a width of the shaft 130, the clip 185 can be self-retained against and around the shaft 130.

The clip 185 can include a thickness 725. The thickness 725 can be substantially (e.g., ±10%) consistent across an entirety of the clip 185, or can vary. For example, in some examples, the first clip arm can include a greater thickness than a portion of the clip 185 that couples the first clip arm 215 with the second clip arm 220. The thickness 725 can be approximately (e.g., ±10%) 1 millimeter, greater than 1 millimeter, or less than one millimeter.

Figure 5:
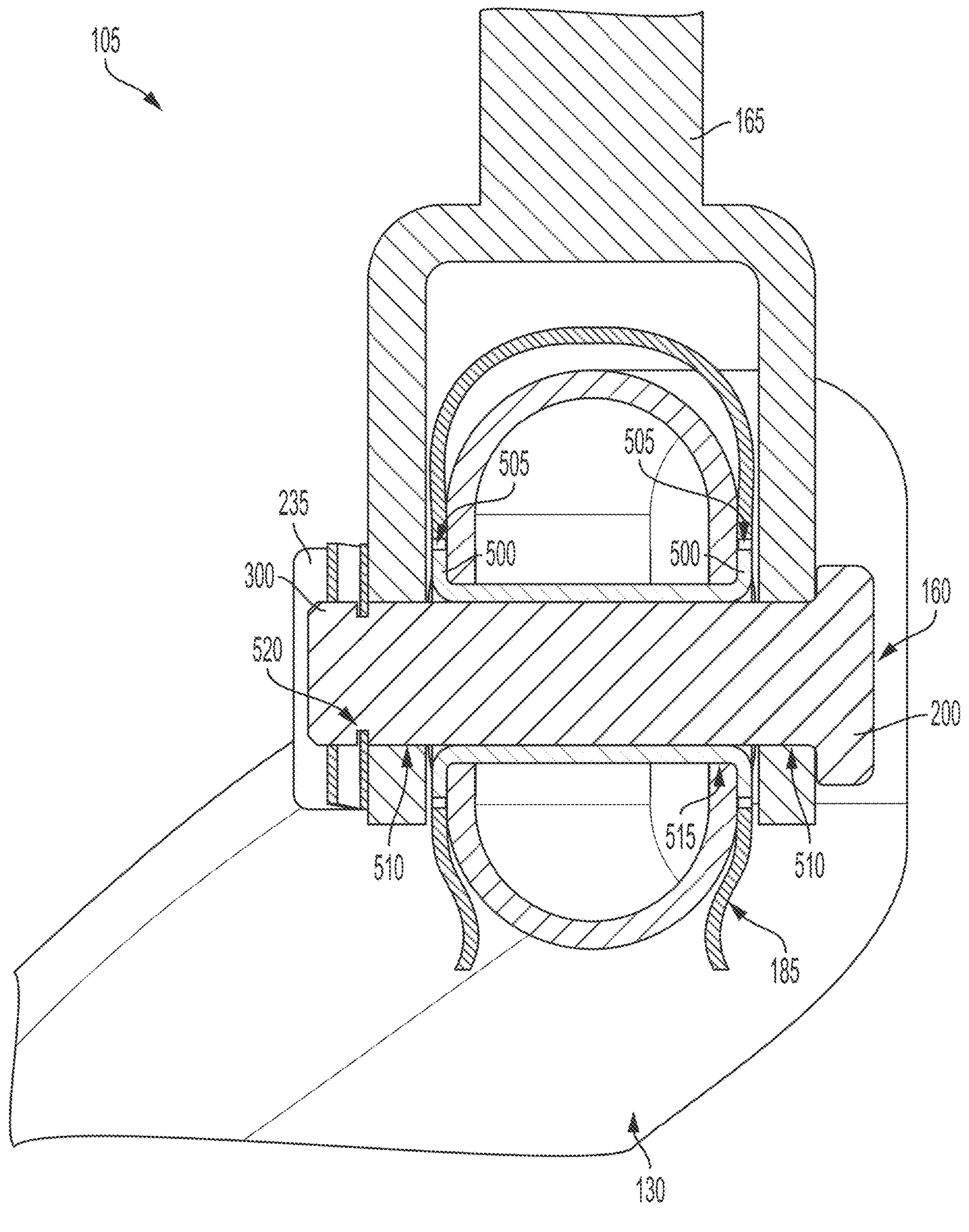
FIG. 5 is a cross-sectional view of an example brake assembly, in accordance with some aspects.
Figure 6:
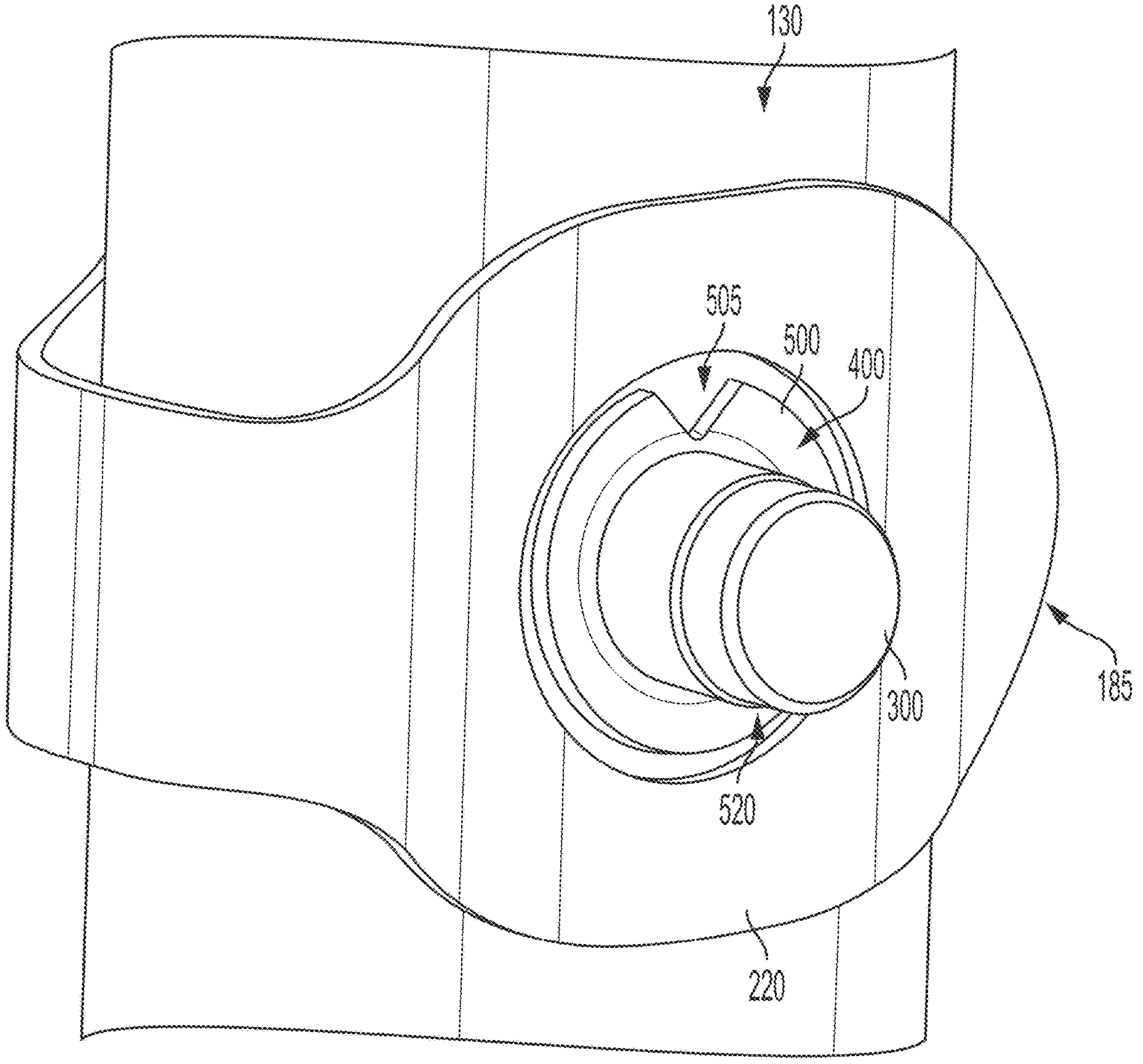
FIG. 6 depicts an example noise-mitigating clip of a brake assembly, in accordance with some aspects.

As depicted in FIGS. 1-5, among others, the clevis 155 of the brake booster assembly 150 can be coupled with the shaft 130 via a pin 160. For example, as shown in FIG. 5, among others, the first clevis arm 205 can define a first clevis aperture 510, the first clip arm 215 of the clip 185 can define a first clip aperture 505, the shaft 130 can define a shaft aperture 515, the second clip arm 220 of the clip 185 can define a second clip aperture 505, and the second clevis arm 210 can define a second clevis aperture 510. The pin 160 can be provided through each of the first clevis aperture 510, the first clip aperture 505, the shaft aperture 515, the second clip aperture 505, and the second clevis aperture 510. For example, each of the first clevis aperture 510, the first clip aperture 505, the shaft aperture 515, the second clip aperture 505, and the second clevis aperture 510 can be at least partially aligned such that the pin 160 can simultaneously extend through all of the first clevis aperture 510, the first clip aperture 505, the shaft aperture 515, the second clip aperture 505, and the second clevis aperture 510. The pin 160 can include a pin head 200 and a pin end 300. The pin end 300 can include a coupling feature 520, shown as a groove 525, that can engage with a fastener 235 to retain the pin 160 within each of the first clevis aperture 510, the first clip aperture 505, the shaft aperture 515, the second clip aperture 505, and the second clevis aperture 510.

The brake assembly 105 can include a sleeve 400. The sleeve 400 can include a first sleeve end 500 and a second sleeve end 500. The sleeve 400 can be positioned within the shaft 130. For example, the sleeve 400 can extend through the shaft aperture 515 with the first sleeve end 500 positioned against the first surface 230 of the shaft 130 and the second sleeve end 500 positioned against the second surface 305 of the shaft 130. The first sleeve end 500 and the second sleeve end 600 can include diameter that is greater than a diameter of a portion of the sleeve 400 positioned between the first sleeve end 500 and the second sleeve end 500. Consequently, the sleeve 400 can be captured within the shaft aperture 515. For example, the pin 160 can extend through the sleeve 400 within the shaft aperture 515. As noted above, the clip 185 can be positioned against the shaft 130. The first clip aperture 505 of the first clip arm 215 can include a diameter or dimension that is greater than a diameter of the first sleeve end 500 such that the first sleeve end 500 is positioned within the first clip aperture 505. The second clip aperture 505 of the second clip arm 220 can include a diameter or dimension that is greater than a diameter of the second sleeve end 500 such that the second sleeve end 500 is positioned within the second clip aperture 505.

The clip 185 can mitigate a noise caused by an interaction between the clevis 155 and the shaft 130 during operation of the brake assembly 105. For example, as a user depresses the pedal 120 or as the motor 175 actuates the pushrod 165, the clevis 155 and the shaft 130 can interact. Such interaction can be a movement of the shaft 130 relative to the clevis 155, which causes a corresponding movement of the clevis 155 via the pin 160 that couples the clevis 155 with the shaft 130. For example, the shaft 130 can move, which can apply a force to the clevis 155 via the pin 160, where movement of the shaft 130 relative to the pin 160 or the clevis 155 can cause the clevis 155 to contact the shaft 130. Without the clip 185, the contact between the shaft 130 and the clevis 155 can result in an audible noise that can be heard by a driver of the vehicle. However, with the clip 185 positioned between the shaft 130 and the first clevis arm 205 and between the shaft 130 and the second clevis arm 210 and respectively applying a force to each of the shaft 130, the first clevis arm 205, and the second clevis arm 210, the audible noise can be reduced, mitigated, or substantially eliminated. For example, rather than the shaft 130 striking the clevis 155 or some other component and creating an audible noise, any movement of the shaft 130 relative to the clevis 155 must first overcome the spring force applied by the clip 185 against the shaft 130 and the clevis 155. Because the shaft 130 must first overcome the spring force applied by the clip 185 against the shaft 130 and the clevis 155, an acceleration of the shaft 130 relative to the clevis 155 can be momentarily slowed and consequently reduce, mitigate or substantially eliminate a noise produced by interaction of the shaft 130 with the clevis 155. Such noise-mitigation is particularly necessary in the case of automatic actuation of the brake assembly 105 via the motor 175 as part of a brake assist system. For example, when the motor 175 causes a movement of the pushrod 165, an acceleration of the clevis 155 (which is coupled with the pushrod 165) can be higher than in a case where a driver is manually actuating the brake assembly 105 such that a noise caused by an interaction between the shaft 130 and the clevis 155 can be particularly pronounced.

FIG. 8 depicts an example cross-sectional view 800 of an electric vehicle 805 installed with at least one battery pack 810. Electric vehicles 805 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The vehicle 805 can include the brake assembly 105 having the clip 185 as discussed herein. The battery pack 810 can also be used as an energy storage system to power a building, such as a residential home or commercial building. Electric vehicles 805 can be fully electric or partially electric (e.g., plug-in hybrid) and further, electric vehicles 805 can be fully autonomous, partially autonomous, or unmanned. Electric vehicles 805 can also be human operated or non-autonomous. Electric vehicles 805 such as electric trucks or automobiles can include on-board battery packs 810, batteries 815 or battery modules 815, or battery cells 820 to power the electric vehicles. The electric vehicle 805 can include a chassis 825 (e.g., a frame, internal frame, or support structure). The chassis 825 can support various components of the electric vehicle 805. The chassis 825 can span a front portion 830 (e.g., a hood or bonnet portion), a body portion 835, and a rear portion 840 (e.g., a trunk, payload, or boot portion) of the electric vehicle 805. The battery pack 810 can be installed or placed within the electric vehicle 805. For example, the battery pack 810 can be installed on the chassis 825 of the electric vehicle 805 within one or more of the front portion 830, the body portion 835, or the rear portion 840. The battery pack 810 can include or connect with at least one busbar, e.g., a current collector element. For example, the first busbar 845 and the second busbar 850 can include electrically conductive material to connect or otherwise electrically couple the battery 815, the battery modules 815, or the battery cells 820 with other electrical components of the electric vehicle 805 to provide electrical power to various systems or components of the electric vehicle 805.

Figure 9:
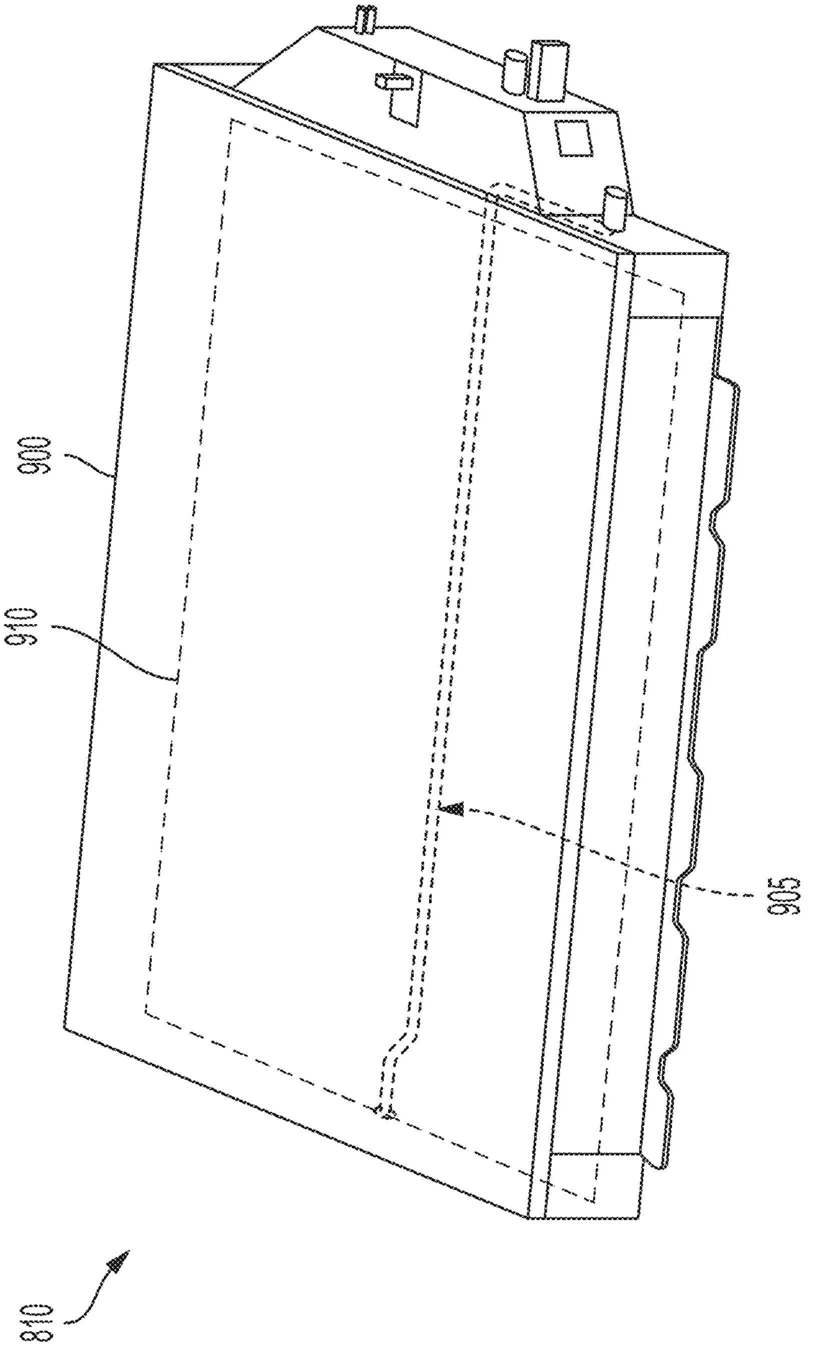
FIG. 9 depicts battery pack, in accordance with some aspects.

FIG. 9 depicts an example battery pack 810. Referring to FIG. 9, among others, the battery pack 810 can provide power to electric vehicle 805. Battery packs 810 can include any arrangement or network of electrical, electronic, mechanical or electromechanical devices to power a vehicle of any type, such as the electric vehicle 805. The battery pack 810 can include at least one housing 900. The housing 900 can include at least one battery module 815 or at least one battery cell 820, as well as other battery pack components. The battery module 815 can be or can include one or more groups of prismatic cells, cylindrical cells, pouch cells, or other form factors of battery cells 820. The housing 900 can include a shield on the bottom or underneath the battery module 815 to protect the battery module 815 and/or cells 820 from external conditions, for example if the electric vehicle 805 is driven over rough terrains (e.g., off-road, trenches, rocks, etc.) The battery pack 810 can include at least one cooling line 905 that can distribute fluid through the battery pack 810 as part of a thermal/temperature control or heat exchange system that can also include at least one thermal component (e.g., cold plate) 910. The thermal component 910 can be positioned in relation to a top submodule and a bottom submodule, such as in between the top and bottom submodules, among other possibilities. The battery pack 810 can include any number of thermal components 910. For example, there can be one or more thermal components 910 per battery pack 810, or per battery module 815. At least one cooling line 905 can be coupled with, part of, or independent from the thermal component 910.

Figure 10:
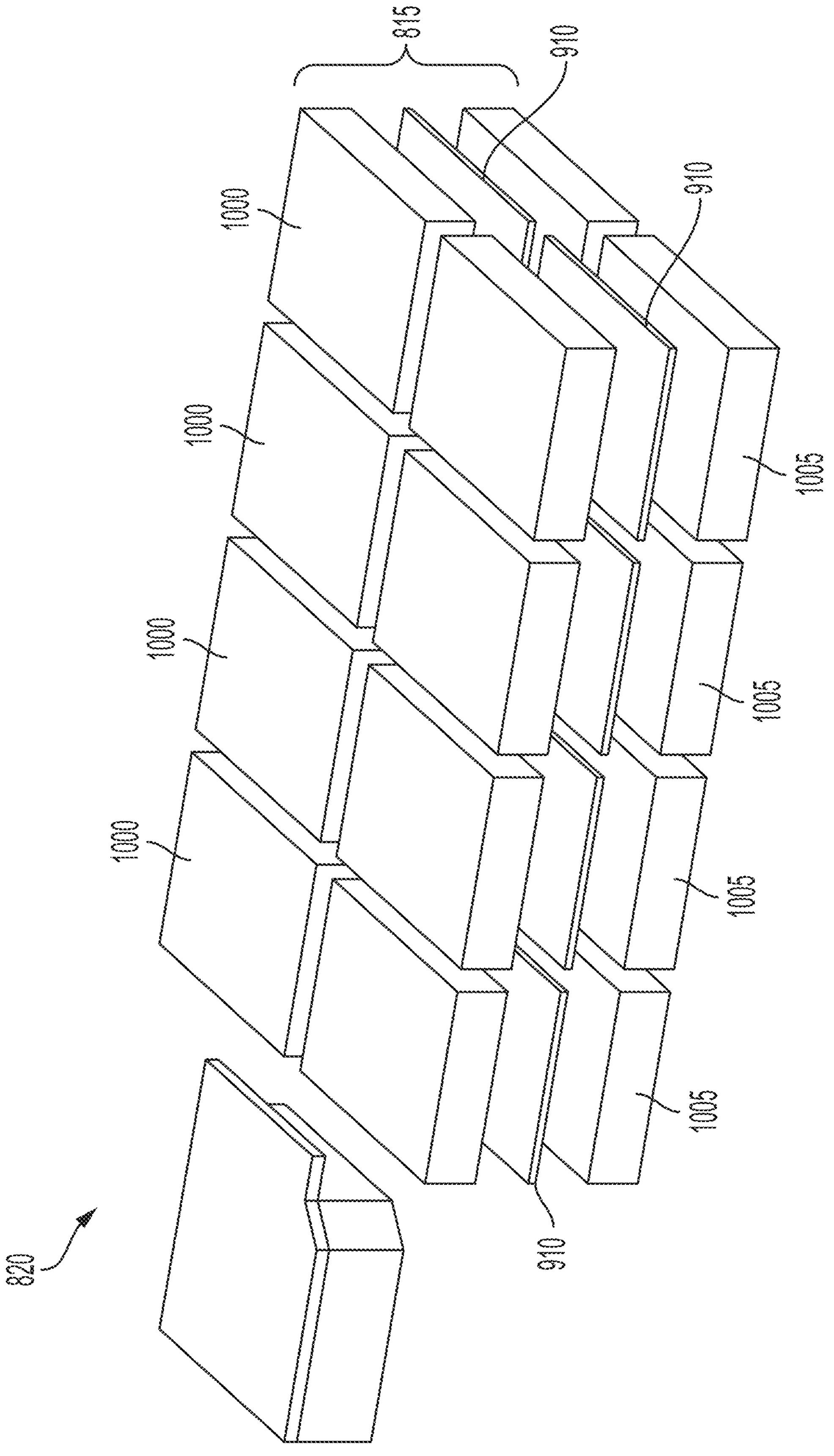
FIG. 10 depicts battery module, in accordance with some aspects.
Figure 11:
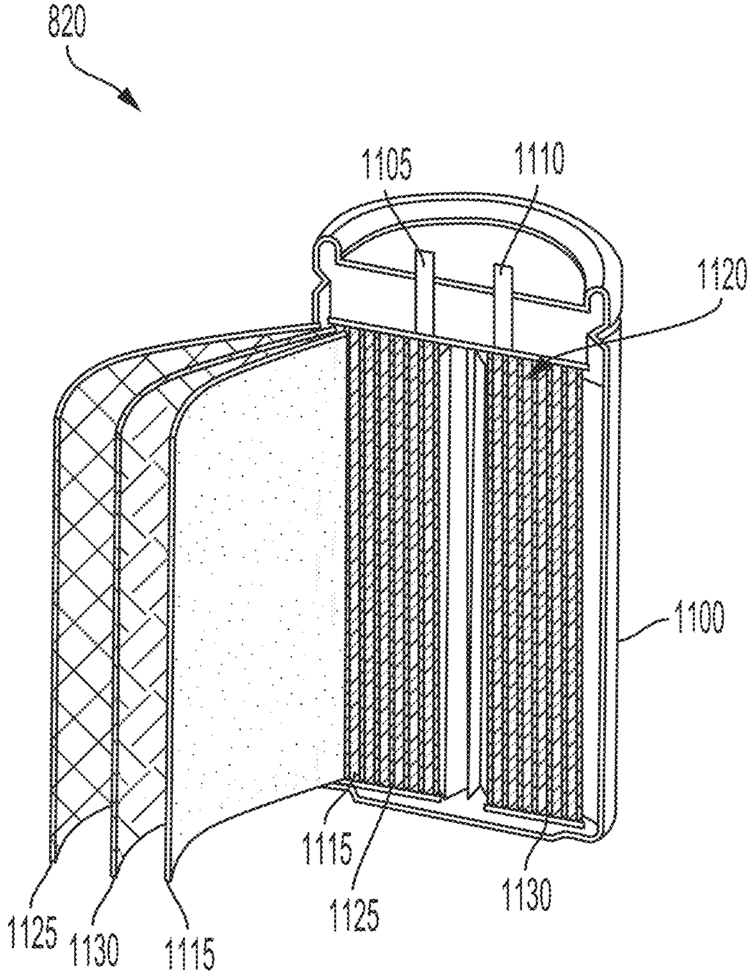
FIG. 11 depicts a cross sectional view of a battery cell, in accordance with some aspects.
Figure 12:
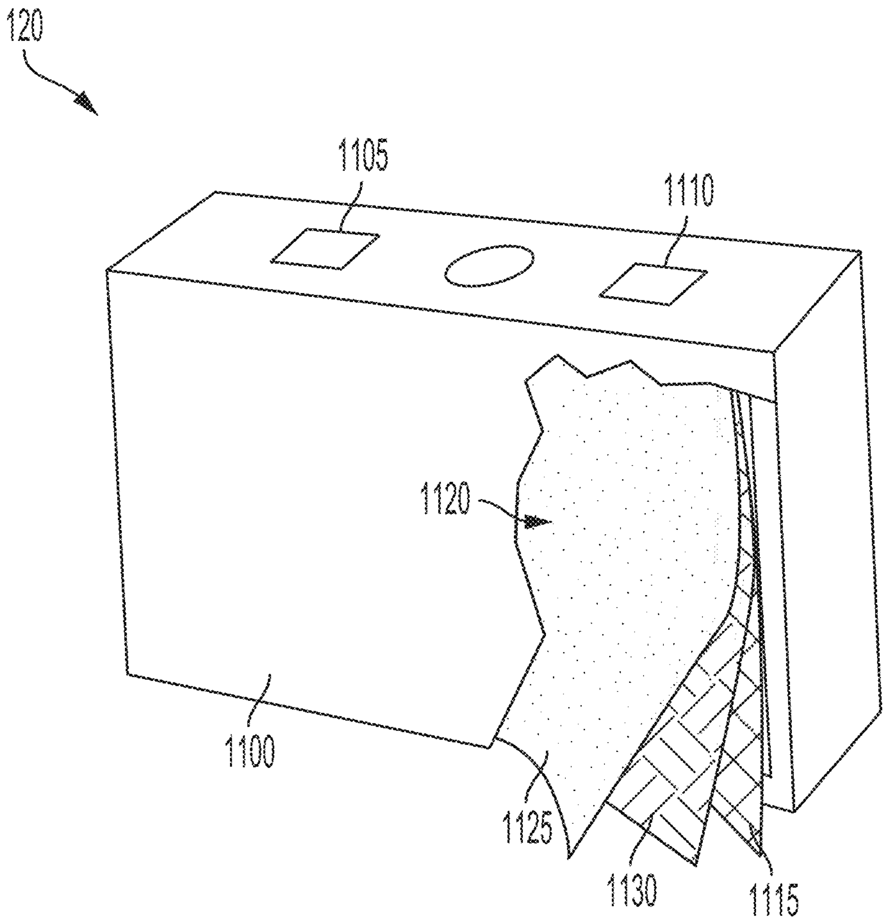
FIG. 12 depicts a cross sectional view of a battery cell, in accordance with some aspects.
Figure 13:
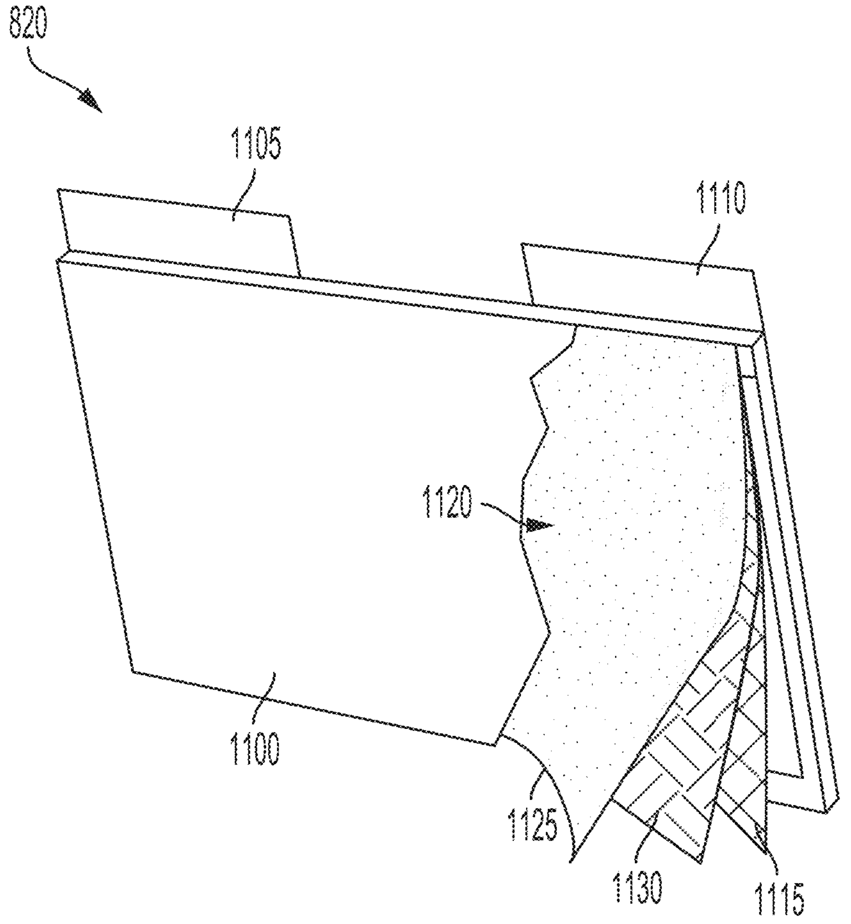
FIG. 13 depicts a cross sectional view of a battery cell, in accordance with some aspects.

FIG. 10 depicts example battery modules 815, and FIGS. 11, 12 and 13 depict an example cross sectional view of a battery cell 820. The battery modules 815 can include at least one submodule. For example, the battery modules 815 can include at least one first (e.g., top) submodule 1000 or at least one second (e.g., bottom) submodule 1005. At least one thermal component 910 can be disposed between the top submodule 1000 and the bottom submodule 1005. For example, one thermal component 910 can be configured for heat exchange with one battery module 815. The thermal component 910 can be disposed or thermally coupled between the top submodule 1000 and the bottom submodule 1005. One thermal component 910 can also be thermally coupled with more than one battery module 815 (or more than two submodules 1000, 1005). The thermal components 910 shown adjacent to each other can be combined into a single thermal component 910 that spans the size of one or more submodules 1000 or 1005. The thermal component 910 can be positioned underneath submodule 1000 and over submodule 1005, in between submodules 1000 and 1005, on one or more sides of submodules 1000, 1005, among other possibilities. The thermal component 910 can be disposed in sidewalls, cross members, structural beams, among various other components of the battery pack, such as battery pack 810 described above. The battery submodules 1000, 1005 can collectively form one battery module 815. In some examples each submodule 1000, 1005 can be considered as a complete battery module 815, rather than a submodule.

The battery modules 815 can each include a plurality of battery cells 820. The battery modules 815 can be disposed within the housing 900 of the battery pack 810. The battery modules 815 can include battery cells 820 that are cylindrical cells or prismatic cells, for example. The battery module 815 can operate as a modular unit of battery cells 820. For example, a battery module 815 can collect current or electrical power from the battery cells 820 that are included in the battery module 815 and can provide the current or electrical power as output from the battery pack 810. The battery pack 810 can include any number of battery modules 815. For example, the battery pack can have one, two, three, four, five, six, seven, eight, nine, ten, eleven, twelve or other number of battery modules 815 disposed in the housing 900. It should also be noted that each battery module 815 may include a top submodule 1000 and a bottom submodule 1005, possibly with a thermal component 910 in between the top submodule 1000 and the bottom submodule 1005. The battery pack 810 can include or define a plurality of areas for positioning of the battery module 815 and/or cells 820. The battery modules 815 can be square, rectangular, circular, triangular, symmetrical, or asymmetrical. In some examples, battery modules 815 may be different shapes, such that some battery modules 815 are rectangular but other battery modules 815 are square shaped, among other possibilities. The battery module 815 can include or define a plurality of slots, holders, or containers for a plurality of battery cells 820. It should be noted the illustrations and descriptions herein are provided for example purposes and should not be interpreted as limiting. For example, the battery cells 820 can be inserted in the battery pack 810 without battery modules 1000 and 1005. The battery cells 820 can be disposed in the battery pack 810 in a cell-to-pack configuration without modules 1000 and 1005, among other possibilities.

Battery cells 820 have a variety of form factors, shapes, or sizes. For example, battery cells 820 can have a cylindrical, rectangular, square, cubic, flat, pouch, elongated or prismatic form factor. As depicted in FIG. 11, for example, the battery cell 820 can be cylindrical. As depicted in FIG. 12, for example, the battery cell 820 can be prismatic. As depicted in FIG. 13, for example, the battery cell 820 can include a pouch form factor. Battery cells 820 can be assembled, for example, by inserting a winded or stacked electrode roll (e.g., a jelly roll) including electrolyte material into at least one battery cell housing 1100. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 820 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 820. The housing 1100 can be of various shapes, including cylindrical or rectangular, for example. Electrical connections can be made between the electrolyte material and components of the battery cell 820. For example, electrical connections to the electrodes with at least some of the electrolyte material can be formed at two points or areas of the battery cell 820, for example to form a first polarity terminal 1105 (e.g., a positive or anode terminal) and a second polarity terminal 1110 (e.g., a negative or cathode terminal). The polarity terminals can be made from electrically conductive materials to carry electrical current from the battery cell 820 to an electrical load, such as a component or system of the electric vehicle 805.

For example, the battery cell 820 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 820 to separate the anode and cathode from each other and to facilitate transfer of lithium ions between the anode and cathode. It should be noted that battery cell 820 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, SnS—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 820 can be included in battery modules 815 or battery packs 810 to power components of the electric vehicle 805. The battery cell housing 1100 can be disposed in the battery module 815, the battery pack 810, or a battery array installed in the electric vehicle 805. The housing 1100 can be of any shape, such as cylindrical with a circular (e.g., as depicted in FIG. 11, among others), elliptical, or ovular base, among others. The shape of the housing 1100 can also be prismatic with a polygonal base, as shown in FIG. 12, among others. As shown in FIG. 13, among others, the housing 1100 can include a pouch form factor. The housing 1100 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The housing 1100 of the battery cell 820 can include one or more materials with various electrical conductivity or thermal conductivity, or a combination thereof. The electrically conductive and thermally conductive material for the housing 1100 of the battery cell 820 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 1100 of the battery cell 820 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 1100 of the battery cell 820 is prismatic (e.g., as depicted in FIG. 12, among others) or cylindrical (e.g., as depicted in FIG. 11, among others), the housing 1100 can include a rigid or semi-rigid material such that the housing 1100 is rigid or semi-rigid (e.g., not easily deformed or manipulated into another shape or form factor). In examples where the housing 1100 includes a pouch form factor (e.g., as depicted in FIG. 13, among others), the housing 1100 can include a flexible, malleable, or non-rigid material such that the housing 1100 can be bent, deformed, manipulated into another form factor or shape.

The battery cell 820 can include at least one anode layer 1115, which can be disposed within the cavity 1120 defined by the housing 1100. The anode layer 1115 can include a first redox potential. The anode layer 1115 can receive electrical current into the battery cell 820 and output electrons during the operation of the battery cell 820 (e.g., charging or discharging of the battery cell 820). The anode layer 1115 can include an active substance. The active substance can include, for example, an activated carbon or a material infused with conductive materials (e.g., artificial or natural graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with $sp^2$ hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 820 can include at least one cathode layer 1125 (e.g., a composite cathode layer compound cathode layer, a compound cathode, a composite cathode, or a cathode). The cathode layer 1125 can include a second redox potential that can be different than the first redox potential of the anode layer 1115. The cathode layer 1125 can be disposed within the cavity 1120. The cathode layer 1125 can output electrical current out from the battery cell 820 and can receive electrons during the discharging of the battery cell 820. The cathode layer 1125 can also receive lithium ions during the discharging of the battery cell 820. Conversely, the cathode layer 1125 can receive electrical current into the battery cell 820 and can output electrons during the charging of the battery cell 820. The cathode layer 1125 can release lithium ions during the charging of the battery cell 820.

The battery cell 820 can include a layer 1130 disposed within the cavity 1120. The layer 1130 can include a solid electrolyte layer. The layer 1130 can include a separator wetted by a liquid electrolyte. The layer 1130 can include a polymeric material. The layer 1130 can include a polymer separator. The layer 1130 can be arranged between the anode layer 1115 and the cathode layer 1125 to separate the anode layer 1115 and the cathode layer 1125. The polymer separator can physically separate the anode and cathode from a cell short circuit. A separator can be wetted with a liquid electrolyte. The liquid electrolyte can be diffused into the anode layer 1115. The liquid electrolyte can be diffused into the cathode layer 1125. The layer 1130 can help transfer ions (e.g., $Li^+$ ions) between the anode layer 1115 and the cathode layer 1125. The layer 1130 can transfer $Li^+$ cations from the anode layer 1115 to the cathode layer 1125 during the discharge operation of the battery cell 820. The layer 1130 can transfer lithium ions from the cathode layer 1125 to the anode layer 1115 during the charge operation of the battery cell 820.

The redox potential of layers (e.g., the first redox potential of the anode layer 1115 or the second redox potential of the cathode layer 1125) can vary based on a chemistry of the respective layer or a chemistry of the battery cell 820. For example, lithium-ion batteries can include an LFP (lithium iron phosphate) chemistry, an LMFP (lithium manganese iron phosphate) chemistry, an NMC (Nickel Manganese Cobalt) chemistry, an NCA (Nickel Cobalt Aluminum) chemistry, an OLO (Over Lithiated Oxide) chemistry, or an LCO (lithium cobalt oxide) chemistry for a cathode layer (e.g., the cathode layer 1125). Lithium-ion batteries can include a graphite chemistry, a silicon-graphite chemistry, or a lithium metal chemistry for the anode layer (e.g., the anode layer 1115).

For example, lithium-ion batteries can include an olivine phosphate ($LiMPO_4$, M=Fe and/or Co and/or Mn and/or Ni)) chemistry, LISICON or NASICON Phosphates ($Li_3M_2(PO_4)_3$ and $LIMPO_4O_x$, M=Ti, V, Mn, Cr, and Zr), for example lithium iron phosphate (LFP), lithium iron manganese phosphate (LMFP), layered oxides ($LiMO_2$, M=Ni and/or Co and/or Mn and/or Fe and/or Al and/or Mg) examples, NMC (Nickel Manganese Cobalt) chemistry, an NCA (Nickel Cobalt Aluminum) chemistry, or an LCO (lithium cobalt oxide) chemistry for a cathode layer, lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 1125). Lithium-ion batteries can include a graphite chemistry, a silicon-graphite chemistry, or a lithium metal chemistry for the anode layer (e.g., the anode layer 1115). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 1125) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium iron manganese phosphate ("LMFP"). Anode layers (e.g., the anode layer 1115) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The layer 1130 can include or be made of a liquid electrolyte material. For example, the layer 1130 can be or include at least one layer of polymeric material (e.g., polypropylene, polyethylene, or other material) including pores that are wetted (e.g., saturated with, soaked with, receive, are filled with) a liquid electrolyte substance to enable ions to move between electrodes. The liquid electrolyte material can include a lithium salt dissolved in a solvent. The lithium salt for the liquid electrolyte material for the layer 1130 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. Liquid electrolyte is not necessarily disposed near the layer 1130, but the liquid electrolyte can fill the battery cells 820 in many different ways. The layer 1130 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S—P_2S_5$, $Li_2S—B_2S_3$, $SnS—P_2S_5$, $Li_2S—SiS_2$, $Li_2S—P_2S_5$, $Li_2S—GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the layer 1130 includes a liquid electrolyte material, the layer 1130 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The layer 1130 can include at least one additive. The additives can be or include vinylidene carbonate, fluoroethylene carbonate, ethyl propionate, methyl propionate, methyl acetate, ethyl acetate, or a mixture of any two or more thereof. The layer 1130 can include a lithium salt material. For example, the lithium salt can be lithium perchlorate, lithium hexafluorophosphate, lithium bis(fluorosulfonyl)imide, lithium bis(trifluorosulfonyl)imide, or a mixture of any two or more thereof. The lithium salt may be present in the layer 1130 from greater than 0 M to about 1.5 M. Once disposed to the battery cell 820, liquid electrolyte can be present and touching battery subcomponents present within the battery cell 820. The battery subcomponents can include the cathode, the anode, the separator, the current collector, etc.

Figure 14:
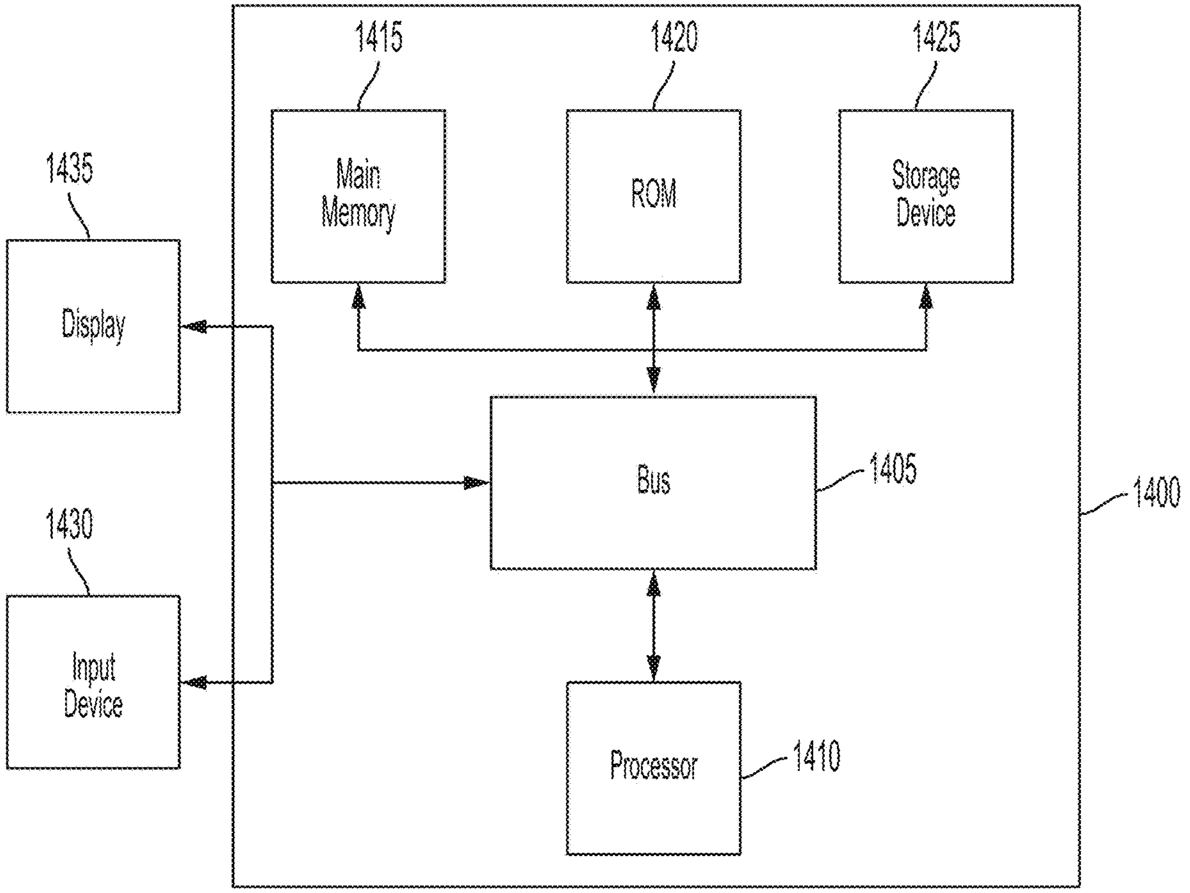
FIG. 14 is a block diagram illustrating an architecture for a computer system that can be employed to implement elements of the systems and methods described and illustrated herein.

FIG. 14 depicts an example block diagram of an example computer system 1400. The computer system or computing device 1400 can include or be used to implement a data processing system or its components. For example, the computing system 1400 can be communicably coupled with the motor 175 of the brake assembly 105 and can control operation of the brake assembly 105 to automatically actuate the brake assembly 105 (e.g., as part of a brake assist function of the vehicle 805). The computing system 1400 includes at least one bus 1405 or other communication component for communicating information and at least one processor 1410 or processing circuit coupled to the bus 1405 for processing information. The computing system 1400 can also include one or more processors 1410 or processing circuits coupled to the bus for processing information. The computing system 1400 also includes at least one main memory 1415, such as a random access memory (RAM) or other dynamic storage device, coupled to the bus 1405 for storing information, and instructions to be executed by the processor 1410. The main memory 1415 can be used for storing information during execution of instructions by the processor 1410. The computing system 1400 may further include at least one read only memory (ROM) 1420 or other static storage device coupled to the bus 1405 for storing static information and instructions for the processor 1410. A storage device 1425, such as a solid state device, magnetic disk or optical disk, can be coupled to the bus 1405 to persistently store information and instructions.

The computing system 1400 may be coupled via the bus 1405 to a display 1435, such as a liquid crystal display, or active matrix display, for displaying information to a user such as a driver of the electric vehicle 805 or other end user. An input device 1430, such as a keyboard or voice interface may be coupled to the bus 1405 for communicating information and commands to the processor 1410. The input device 1430 can include a touch screen display 1435. The input device 1430 can also include a cursor control, such as a mouse, a trackball, or cursor direction keys, for communicating direction information and command selections to the processor 1410 and for controlling cursor movement on the display 1435.

The processes, systems and methods described herein can be implemented by the computing system 1400 in response to the processor 1410 executing an arrangement of instructions contained in main memory 1415. Such instructions can be read into main memory 1415 from another computer-readable medium, such as the storage device 1425. Execution of the arrangement of instructions contained in main memory 1415 causes the computing system 1400 to perform the illustrative processes described herein. One or more processors in a multi-processing arrangement may also be employed to execute the instructions contained in main memory 1415. Hard-wired circuitry can be used in place of or in combination with software instructions together with the systems and methods described herein. Systems and methods described herein are not limited to any specific combination of hardware circuitry and software.

Although an example computing system has been described in FIG. 14, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A brake assembly, comprising:

a brake pedal shaft defining a shaft aperture;

a brake booster assembly including a pushrod slidably received in a body, the pushrod including a clevis having a first clevis arm and a second clevis arm, the brake pedal shaft to move the pushrod into the body, the first clevis arm defining a first clevis aperture, the second clevis arm defining a second clevis aperture; and a clip including a first clip arm defining a first clip aperture and a second clip arm defining a second clip aperture, the first clip arm positioned between the first clevis arm and the brake pedal shaft, the second clip arm positioned between the second clevis arm and the brake pedal shaft, the clip to mitigate a noise caused by an interaction between the clevis and the brake pedal shaft during operation of the brake assembly;

a pin positioned within the first clevis aperture, the first clip aperture, the shaft aperture, the second clip aperture, and the second clevis aperture, the pin to couple the brake pedal shaft with the clevis with the clip disposed therebetween; and a sleeve extending through the shaft aperture, the sleeve including a first sleeve end and a second sleeve end, the first sleeve end positioned within the first clip aperture, the second sleeve end positioned within the second clip aperture.

2. The brake assembly of claim 1, comprising:

the first clip arm including a first curved portion and a second curved portion, the first curved portion positioned against the brake pedal shaft, the second curved portion positioned against the first clevis arm.

3. The brake assembly of claim 1, comprising:

the first clip arm including a first curved portion and a second curved portion, the first curved portion positioned against the brake pedal shaft, the second curved portion positioned against the first clevis arm; and the first clip arm including a compliant material to apply a force to the first clevis arm and the brake pedal shaft.

4. The brake assembly of claim 1, comprising:

the first clip arm including a first curved portion, a second curved portion, and a third curved portion, the first curved portion and the third curved portion positioned against the brake pedal shaft, the second curved portion positioned against the first clevis arm, the second curved portion positioned between the first curved portion and the third curved portion; and the first clip arm including a compliant material to apply a force to the first clevis arm and the brake pedal shaft.

5. The brake assembly of claim 1, comprising:

the first clip arm including a first curved portion and a second curved portion, the first curved portion positioned against the brake pedal shaft, the second curved portion positioned against the first clevis arm;

the second clip arm including a first curved portion and a second curved portion, the first curved portion positioned against the brake pedal shaft, the second curved portion positioned against the second clevis arm;

the first curved portion of the first clip arm positioned a first distance from the first curved portion of the second clip arm, the second curved portion of the first clip arm positioned a second distance from the second curved portion of the second clip arm, the first distance less than the second distance; and the clip including a compliant material to apply a force to the first clevis arm and the brake pedal shaft.

6. An electric vehicle, comprising:

a battery pack; and a brake pedal assembly, including:

a brake pedal shaft defining a shaft aperture;

a brake booster assembly including a pushrod slidably received in a body, the pushrod including a clevis having a first clevis arm and a second clevis arm, the brake pedal shaft to move the pushrod into the body, the first clevis arm defining a first clevis aperture, the second clevis arm defining a second clevis aperture; and a clip including a first clip arm defining a first clip aperture and a second clip arm defining a second clip aperture, the first clip arm positioned between the first clevis arm and the brake pedal shaft, the second clip arm positioned between the second clevis arm and the brake pedal shaft, the clip to mitigate a noise caused by an interaction between the clevis and the brake pedal shaft during operation of the brake pedal assembly;

a pin positioned within the first clevis aperture, the first clip aperture, the shaft aperture, the second clip aperture, and the second clevis aperture, the pin to couple the brake pedal shaft with the clevis with the clip disposed therebetween; and a sleeve extending through the shaft aperture, the sleeve including a first sleeve end and a second sleeve end, the first sleeve end positioned within the first clip aperture, the second sleeve end positioned within the second clip aperture.

7. The electric vehicle of claim 6, comprising:

the first clip arm including a first curved portion and a second curved portion, the first curved portion positioned against the brake pedal shaft, the second curved portion positioned against the first clevis arm.

8. The electric vehicle of claim 6, comprising:

the first clip arm including a first curved portion and a second curved portion, the first curved portion positioned against the brake pedal shaft, the second curved portion positioned against the first clevis arm; and the first clip arm including a compliant material to apply a force to the first clevis arm and the brake pedal shaft.

9. The electric vehicle of claim 6, comprising:

the first clip arm including a first curved portion, a second curved portion, and a third curved portion, the first curved portion and the third curved portion positioned against the brake pedal shaft, the second curved portion positioned against the first clevis arm, the second curved portion positioned between the first curved portion and the third curved portion; and the first clip arm including a compliant material to apply a force to the first clevis arm and the brake pedal shaft.

10. The electric vehicle of claim 6, comprising:

the first clip arm including a first curved portion and a second curved portion, the first curved portion positioned against the brake pedal shaft, the second curved portion positioned against the first clevis arm;

the second clip arm including a first curved portion and a second curved portion, the first curved portion positioned against the brake pedal shaft, the second curved portion positioned against the second clevis arm;

the first curved portion of the first clip arm positioned a first distance from the first curved portion of the second clip arm, the second curved portion of the first clip arm positioned a second distance from the second curved portion of the second clip arm, the first distance less than the second distance; and the clip including a compliant material to apply a force to the first clevis arm and the brake pedal shaft.

* * * * *